(12) United States Patent
Reed et al.

(10) Patent No.: US 8,682,842 B2
(45) Date of Patent: Mar. 25, 2014

(54) SYSTEM AND METHOD FOR LOGGING OPERATIONS

(75) Inventors: Benjamin Reed, Morgan Hill, CA (US); Flavio Junqueira, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 1139 days.

(21) Appl. No.: 12/331,326

(22) Filed: Dec. 9, 2008

(65) Prior Publication Data

US 2010/0146331 A1    Jun. 10, 2010

(51) Int. Cl.
*G06F 17/00* (2006.01)
*G06F 7/00* (2006.01)

(52) U.S. Cl.
USPC ............................ 707/607; 707/674; 713/163

(58) Field of Classification Search
USPC .................................. 707/607, 674; 713/163
See application file for complete search history.

(56) References Cited

U.S. PATENT DOCUMENTS

| | | | |
|---|---|---|---|
| 5,598,529 A * | 1/1997 | Garay et al. ..................... | 714/11 |
| 5,668,986 A * | 9/1997 | Nilsen et al. ............. | 707/999.01 |
| 5,717,758 A * | 2/1998 | Micall ............................ | 713/158 |
| 5,828,889 A * | 10/1998 | Moiin et al. ................... | 710/240 |
| 5,864,654 A * | 1/1999 | Marchant .......................... | 714/3 |
| 5,978,779 A * | 11/1999 | Stein et al. ...................... | 705/37 |
| 6,014,669 A * | 1/2000 | Slaughter et al. ............. | 707/610 |
| 6,279,032 B1 * | 8/2001 | Short et al. ..................... | 709/209 |
| 6,405,284 B1 * | 6/2002 | Bridge .......................... | 711/114 |
| 6,532,450 B1 * | 3/2003 | Brown et al. .................... | 705/40 |
| 6,687,851 B1 * | 2/2004 | Somers et al. .................. | 714/12 |
| 7,389,416 B2 * | 6/2008 | Cachin et al. ................. | 713/163 |
| 7,587,434 B2 * | 9/2009 | Zou et al. ................. | 707/999.01 |
| 2002/0116611 A1 * | 8/2002 | Zhou et al. ..................... | 713/156 |
| 2002/0184210 A1 * | 12/2002 | Khan .................................. | 707/6 |
| 2003/0009477 A1 * | 1/2003 | Wilding et al. ............ | 707/104.1 |
| 2003/0028642 A1 * | 2/2003 | Agarwal et al. ............... | 709/226 |
| 2003/0037284 A1 * | 2/2003 | Srinivasan et al. .............. | 714/11 |
| 2004/0098425 A1 * | 5/2004 | Wiss et al. ..................... | 707/204 |
| 2004/0193570 A1 * | 9/2004 | Yaeger .............................. | 707/1 |

* cited by examiner

*Primary Examiner* — Pavan Mamillapalli

(74) *Attorney, Agent, or Firm* — Berkeley Law & Technology Group, LLP

(57) ABSTRACT

In a system for storing and retrieving a plurality of records, the plurality of records associated with a ledger, a client issues read and write requests associated with one of the plurality of records, a plurality of record servers responds to the requests received from the client, and a management server maintains and coordinates, between the client and the record servers, information associated with the ledger, records, and record servers.

20 Claims, 7 Drawing Sheets

SYSTEM AND METHOD FOR LOGGING OPERATIONS

BACKGROUND

1. Field of the Invention

Aspects of the present invention relate generally to a small-quorum system for logging transactions or operations.

2. Description of Related Art

Systems often record executed operations with the intention of using such information along with a recovery protocol to bring the system to a consistent state in the case of failures. Logging such information locally has the drawback of preventing recovery when the server storing this information cannot restart, has lost its stable storage, etc. A typical solution to this problem is to replicate various parts of the system; however, replication can be difficult to implement, and making such a replicated system efficient can be even more difficult.

Thus, it is desirable to use a system that can handle Byzantine failures (i.e., arbitrary deviations from correct or expected behavior) with less replication.

SUMMARY

In light of the foregoing, it is a general object of the present invention to provide a system for reliably storing and making available the operations of an application using a minimal number of record servers.

BRIEF DESCRIPTION OF THE DRAWING FIGURES

FIG. 1 is a functional block diagram of the general architecture of an exemplary embodiment of the present invention.

FIGS. 2A-B are functional block diagrams of the general architecture of a record server.

DETAILED DESCRIPTION

Figure 1:
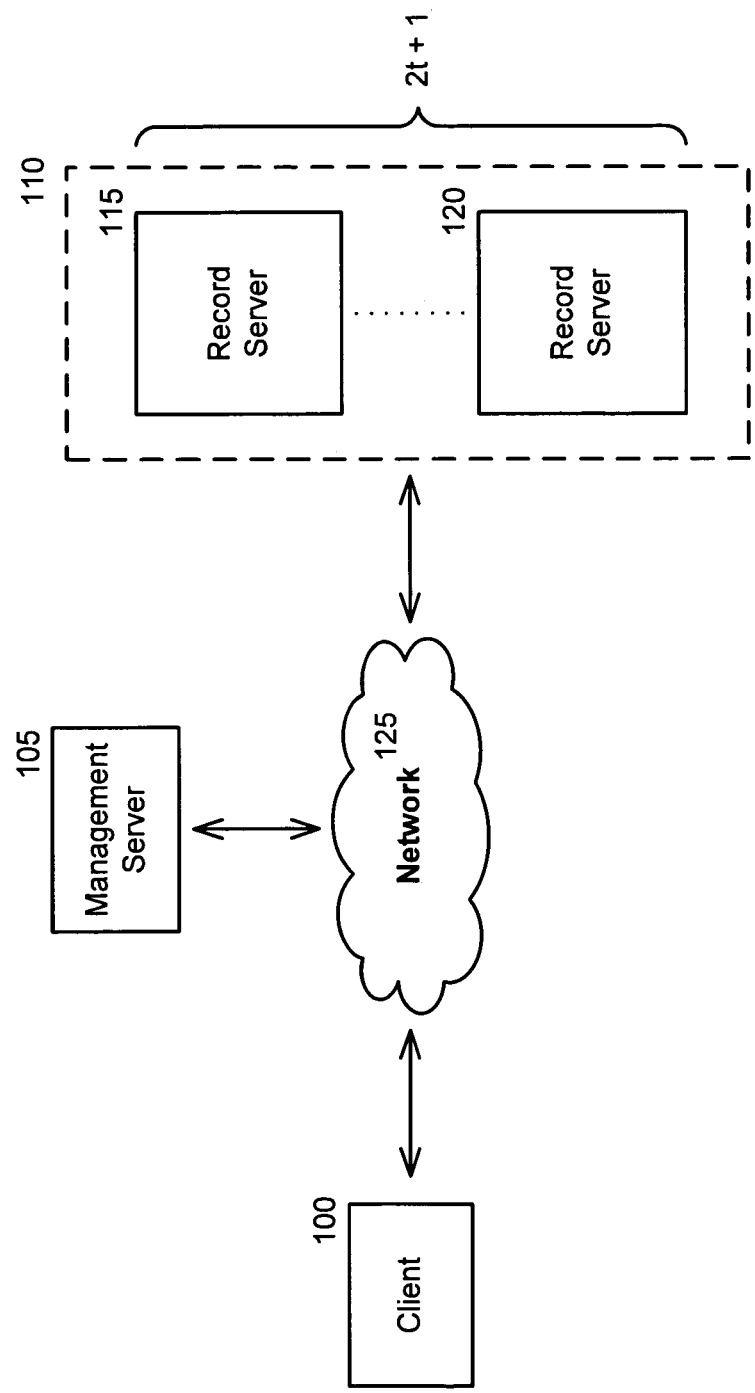

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of a system for logging streams of executed operations (records), where the system can remain fully operational even when some subset of the servers used to maintain the records are simultaneously faulty.

Systems that record executed operations with the intention of using such information together with a recovery protocol to bring the system back up if it should fail, generally store such operations locally, which has the drawback of preventing recovery when the machine storing the information cannot restart, has lost its stable storage, etc. In some distributed file systems—systems that use a write-ahead log (e.g., HDFS)—operations and other file system metadata are logged to a central node (e.g., a server, etc.) so that recovery of those operations is possible in the case that the client fails in some manner before an operation is complete. In such a system, and in an effort to increase reliability, the central node may be replicated and use any of various "agreement" protocols (e.g., 3PC) to guarantee that the operations are saved to enough of the replicas. However, replication in practice can be difficult to implement, and generally suffers from inefficiency. Furthermore, such configurations typically fully replicate the central node, and so throughput generally does not scale according to the number of replicas used.

In light of the above, the present invention mitigates replication by using a minimal number of record servers optimized for logging streams of records, and requiring that each record be written to a quorum of record servers. Indeed, the system requires only $3t+1$ record servers and $2t+1$ write quorums (as detailed herein) to guarantee full functionality, where t is a pre-defined maximum number of record servers that can be simultaneously faulty (e.g., that can fail, corrupt data, lose data, etc.). By having logging implemented as a separate service, the servers that comprise the service can be optimized. For example, multiple devices can be used for record logs of different clients, and the record logs can be written twice to keep read operations from interfering with write operations, which interference can cause latency on the write operations.

Throughout this disclosure, reference is made to "system," which is used to denote various record servers, a management server, and a client. FIG. 1 is a simplified block diagram illustrating how the invention may be employed in accordance with the detailed description. Client 100 may be a computer running software configured to read/write streams of records from/to record server cluster 110 while coordinating with management server 105, which records correspond to operations executed by an application (e.g., a "delete" operation executed by a file system, etc.). It will be understood that in the context of the system, records are generic and can be easily adapted to support various and disparate applications (i.e., logging may be implemented as a service such that various applications can use such logging to suit their particular needs). Each record may contain one or more of the following fields, in addition to the substantive data comprising the record proper:

Ledger ID—the unique ID of the ledger to be used (as detailed herein).

Record ID—the unique ID of the particular record.

LR—the unique ID of the last record that was successfully recorded to the ledger identified by the ledger ID.

Optionally, records also may contain data used to authenticate the record (e.g., an authentication code comprising all other fields in the record, a checksum, etc.). In this case, the system may use as few as $2t+1$ record servers and $t+1$ write quorums, and still guarantee full functionality.

Ledgers, in the context of the system, may be thought of as a group of records, which records belong to a particular application making use of the logging service as implemented by the system. For example, a new ledger may be created, used, and closed each day by an application that creates logs of its operations on a daily schedule. Each ledger spans multiple record servers 115 and 120; no one record server contains the entire ledger, rather the ledger exists in "pieces" across the multiple record servers 115 and 120 to which it is assigned.

Management server 105 may comprise one or more computers and databases running software configured to keep track of, and make available to the client, various system and record-based information needed for the system's operation. The information maintained by management server 105 may include a list of record servers 115 and 120 currently available from record server cluster 110, a list of ledgers and their statuses (i.e., open, closed, etc.), a list of record servers 115 and 120 that have been used for a given ledger, and the record ID of the last record written to each ledger in the system.

Record server cluster 110 may comprise as few as 2t+1 record servers 115 and 120 (and still operate within the system's guarantees, as detailed herein). Client 100, management server 105, and record server cluster 110 are linked together through Network 125 (e.g., the Internet, a local area network, etc.).

Figure 2A:
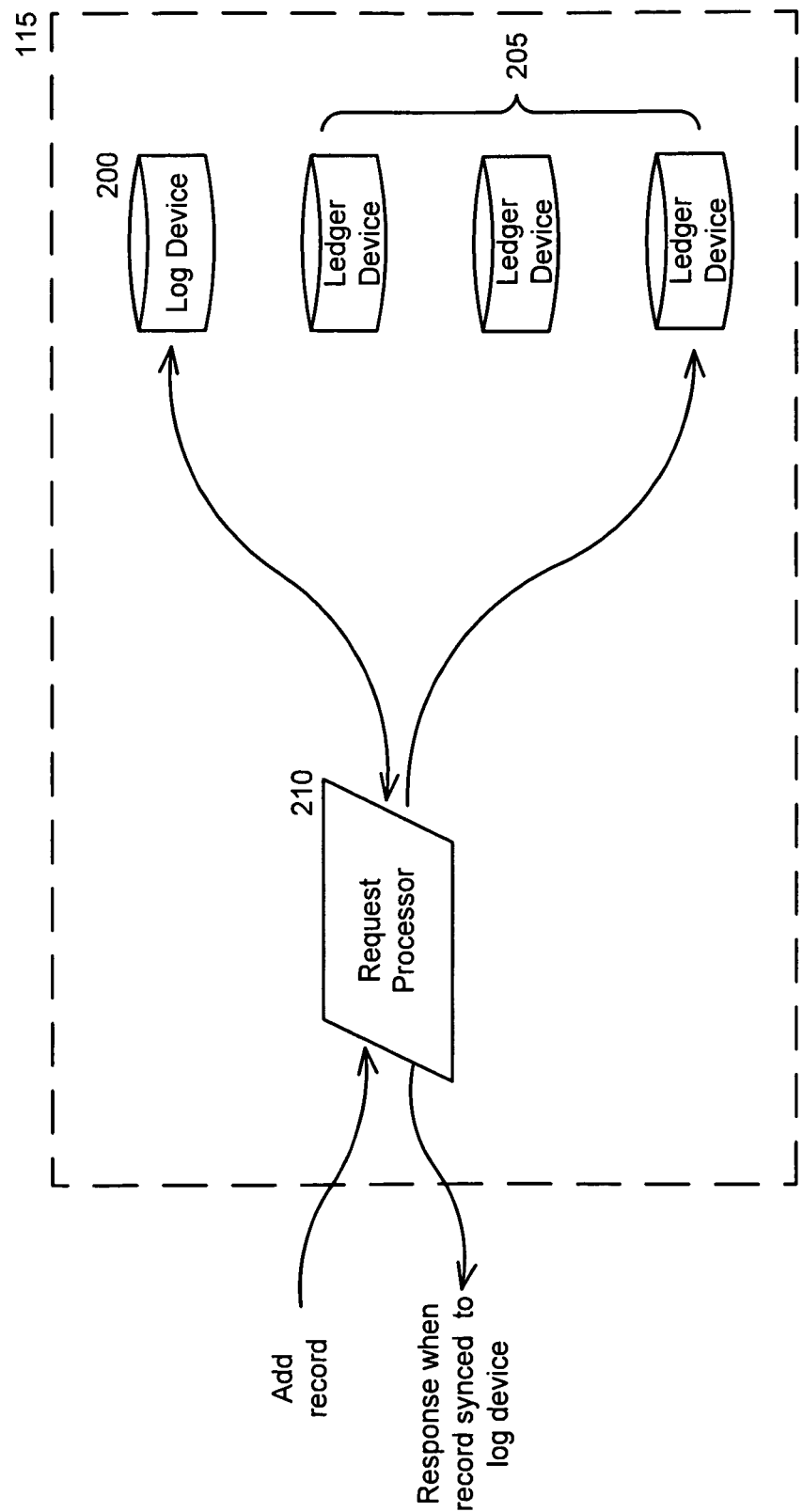
Figure 2B:
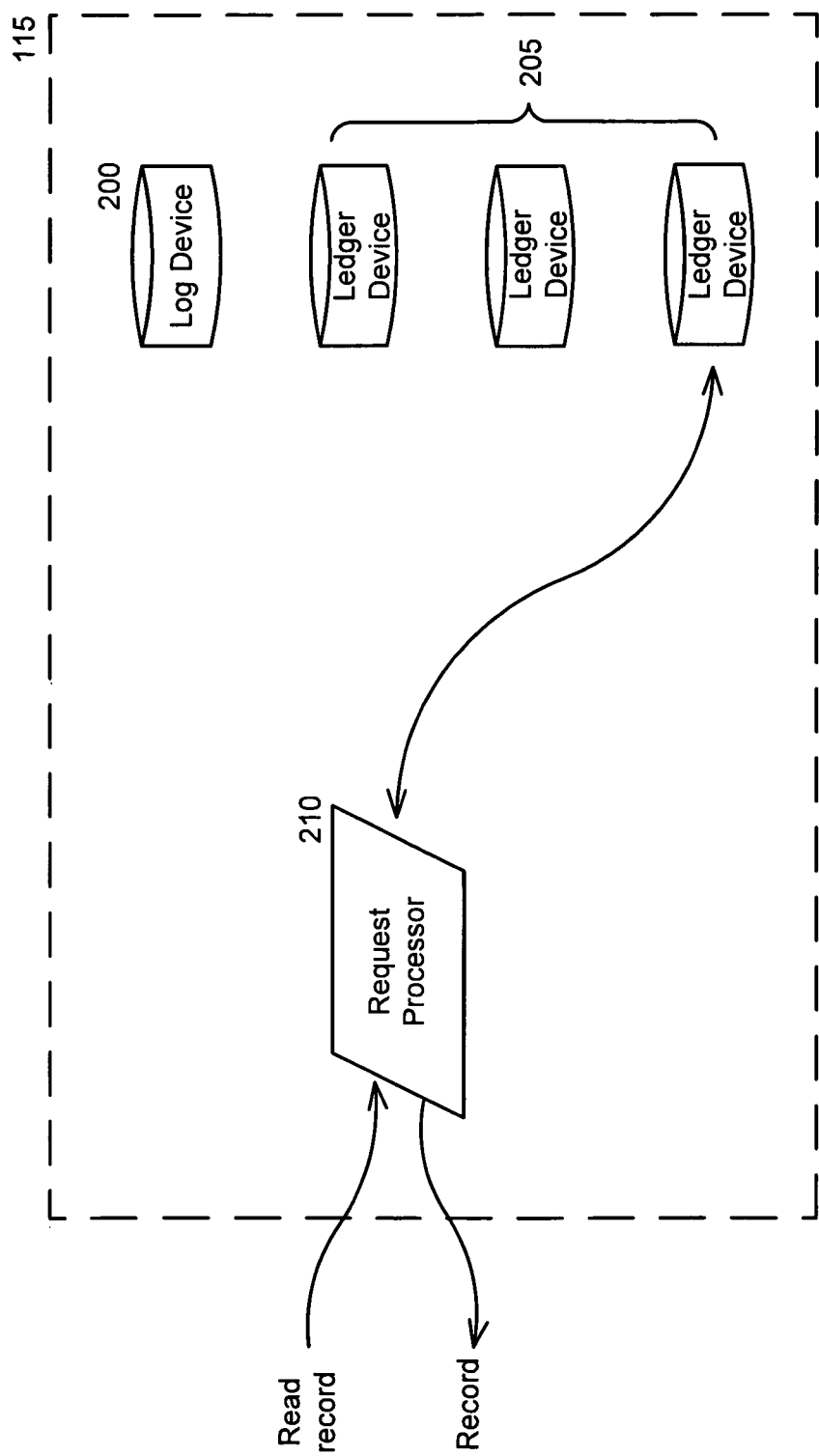

FIGS. 2A-B are simplified block diagrams illustrating record server 115 and its interaction with various parts of the system during write and read operations, respectively. Record server 115 comprises at least log device 200, one or more ledger devices 205, and request processor 210. Log device 200 and ledger devices 205 generally are separate storage mediums (e.g., separate hard drives, solid state drives, etc.). Request processor 210 may comprise software configured to respond to requests received from client 100, by interacting with log device 200 and ledger device 205. Throughout this disclosure, it is assumed that each record server comprises a log device and at least one ledger device; however, it should be appreciated that the system can function without log devices (though depending on the media being written to, and various other factors, performance may suffer).

During a write operation, as shown in FIG. 2A, request processor 210 receives a write request from the client, and causes log device 200 to synchronously store the record, no matter the ledger with which the record is associated. After the record has been written successfully to log device 200, request processor 210 acknowledges to the client that the record was written. Substantially concomitantly with the writing of the record to log device 200, request processor 210 causes ledger device 205 with which the record is associated to asynchronously store the record.

During a read operation, as shown in FIG. 2B, request processor 210 receives a read request from the client, and causes the ledger device 205 to read the record from the ledger device with which it is associated, and pass it to request processor 210, which subsequently sends it to the client.

Generally, it is desired that the record servers enable high-throughput, reliable writes, and efficient reads. By writing the record twice on each record server—once to the log device and once to the particular ledger device associated with the record's ledger—seeks are avoided on the synchronously-written-to log device. Further, and assuming an assignment of ledgers to ledger devices that results in parallel accesses, having multiple ledger devices on each record server allows for less interference of the input/output traffic of multiple ledgers; the impact of mixed read/write traffic on the ledger devices is minimized by using multiple ledger devices, each of which can flush its write cache asynchronously.

The record servers may use any of a number of various means to indicate their availability and other information to the management server, and subsequently the client, and it will be appreciated that the present invention should not be limited by such means. For example, each record server may publish an eXtensible Markup Language (XML) feed(s) containing its various information, which feed(s) may be read at predetermined intervals by the management server. As another example, there may be a protocol worked out between the management server and the record servers whereby the record servers "push" information to the management server as that information arises (e.g., when a ledger is created, etc.). In a similar fashion, the client may send/receive various information to/from the management server (e.g., which record servers are currently available, etc.).

Figure 3:
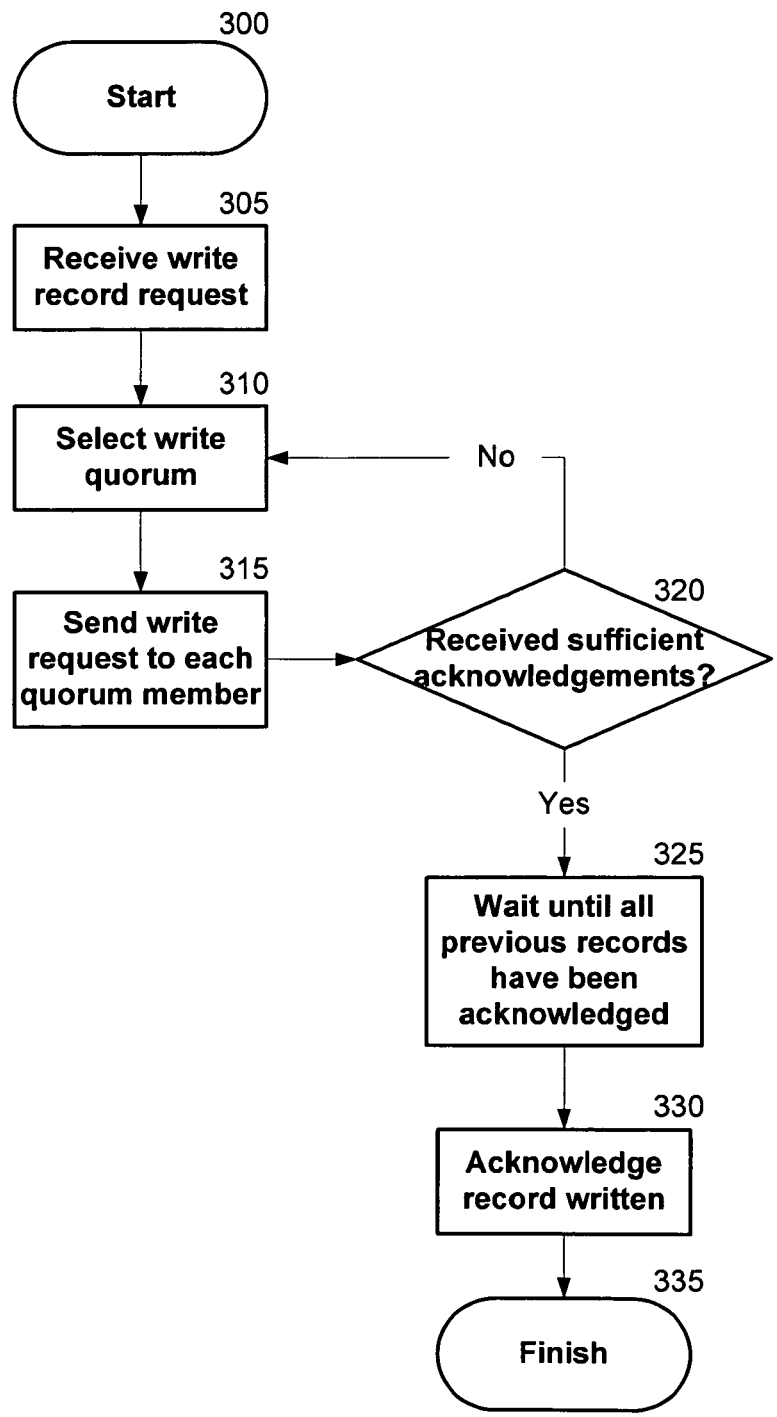
FIG. 3 is a logical flowchart of the general process of writing a record to the system.

A record is considered to have been written to the system when both of the following conditions are met: 1) the record has been recorded successfully to a quorum of record servers; and 2) all records with a record ID that is smaller than the record ID associated with the record currently being stored have been successfully written to a quorum of record servers. FIG. 3 is a logical flowchart of the general process of writing a record to the system. At block 305, the client receives a request to write a record to the system, which request may include some of the fields previously described. At block 310 the client selects a quorum of record servers to which it will attempt to write the record; the quorum may be a subset of the record servers in the list of available record servers received from the management server. At block 315, the client attempts to write the record to each of the record servers in the selected quorum, and then waits for an acknowledgement from each of the record servers that it has recorded the record successfully, as shown at block 320. If after a predetermined amount of time, the client has not received an acknowledgement from each of the record servers, the process goes back to block 310 where the client chooses another quorum of record servers and attempts to write the record to each record server in the new quorum. If the client does receive an acknowledgement from each of the record servers before the predetermined amount of time has elapsed, then the client waits for all records in the ledger—whose record IDs are smaller than the record ID of the record currently being written—to be recorded successfully to their respective quorum of record servers, as shown at block 325. It will be appreciated that the client may have received such an acknowledgement (or its equivalent) before the process outlined in FIG. 3 even begins, in which case the client would not have to "wait" for such an acknowledgement. Once it is determined that the earlier-created records have been recorded successfully, the client acknowledges to the management server that the record has been written to the system, as shown at block 330. The acknowledgement may include identification of the record servers comprising the quorum, the ledger ID, and the record ID.

Figure 4:
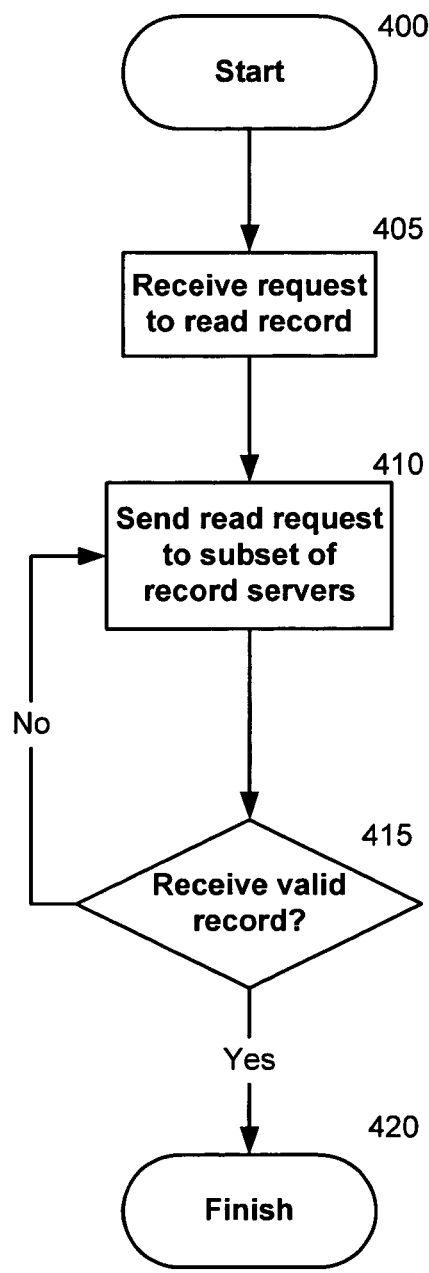
FIG. 4 is a logical flowchart of the general process of reading a record from the system.

FIG. 4 is a logical flowchart of the general process of reading a record from the system. At block 405, the client receives a request to read a record, which request may include some of the fields previously described. At block 410, the client sends the read request to a quorum of record servers (either all at once or one by one), which quorum intersects with the record servers that handled the write operation for this particular record. It will be appreciated that the read request may be sent to all of the record servers instead of just a quorum, depending on desired optimization. If a valid reply is not received from any of the record servers, then the record is again requested from them, as shown at block 415. If a valid reply is received, then the client has received the record it requested and the process ends, as illustrated by block 420.

Figure 5:
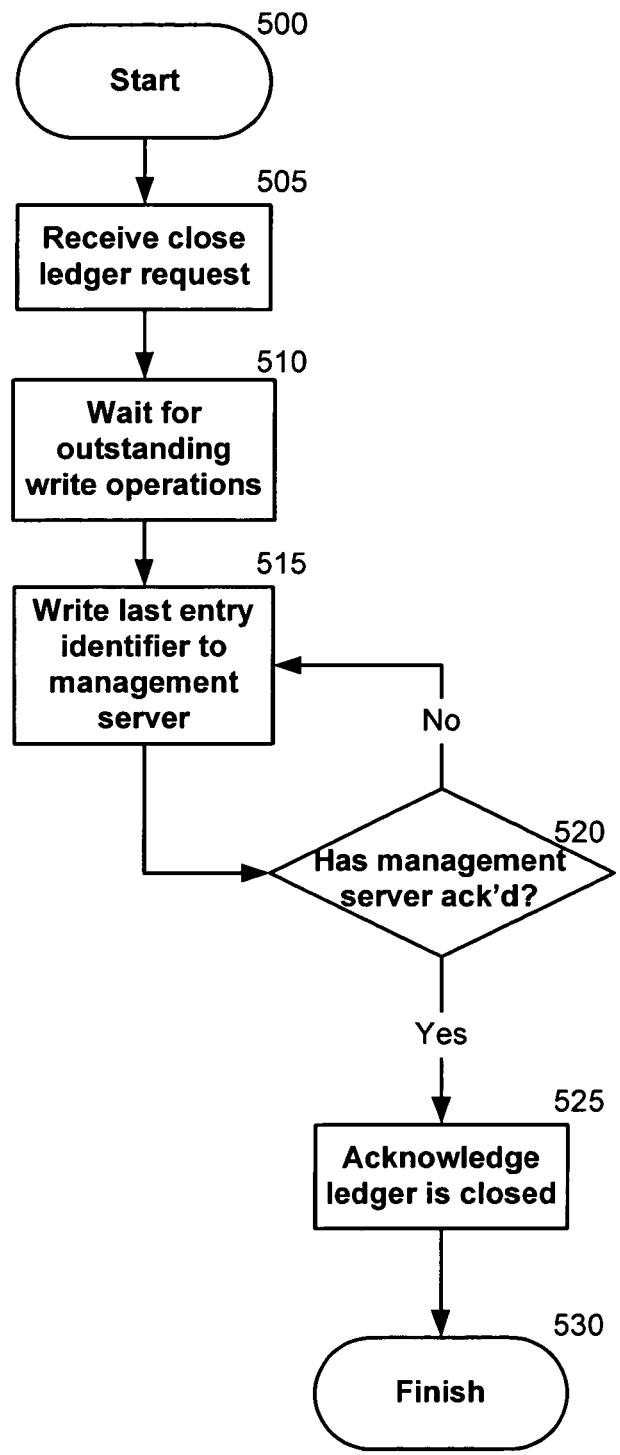
FIG. 5 is a logical flowchart of the general process of closing out a ledger.

FIG. 5 is a logical flowchart of the general process of closing out a ledger. A ledger may be closed out for any of a number of reasons; for example, an application which is using the client to log operations may be shutting down for the day, and wishes to maintain a snapshot of the day's operations (so that the application can, for example, use the system to fall back to that day's snapshot if something fails tomorrow). At block 505, the client receives a request to close the ledger;

once this request is received, the client waits for all currently pending write operations to finish, as shown at block 510. Once any outstanding write operations have completed, the client sends to the management server at least the ledger ID of the ledger and the record ID of the last record that was successfully recorded to the ledger, as illustrated at block 515. If the management server acknowledges the reception of the record ID, then the client acknowledges to the application using the client that the ledger has been closed, as shown at block 525. If the management server does not acknowledge receipt of the record and ledger IDs, then the client re-sends them to the management server until it is acknowledged, as shown by the block 515→520→515 loop.

Closing out a ledger (and finding the last record in the ledger) may be made difficult by the system's durability guarantees, namely that if a record has been written to the system, it must be readable, and if a record is read once, it must always be available to be read. If the ledger was closed gracefully, the management server will have the last record and any read requests sent to the ledger should be responded to without issue. However, if for some reason the client fails before closing the ledger, then some recovery likely will need to be done on the ledger before it can be considered reliably readable.

It is likely that, in the above case, problematic records will be those near the end of the ledger (e.g., the records may have been "in flight" when the client died, etc.). If a record only gets to a single record server, the record should not be readable (i.e., it should not be considered successfully written to the system), because the record will "disappear" if the record server it is written to fails. However, if the record exists on only one record server, that does not necessarily mean that the record has not been successfully written to the system (i.e., the other record servers that recorded the entry may have failed).

Figure 6:
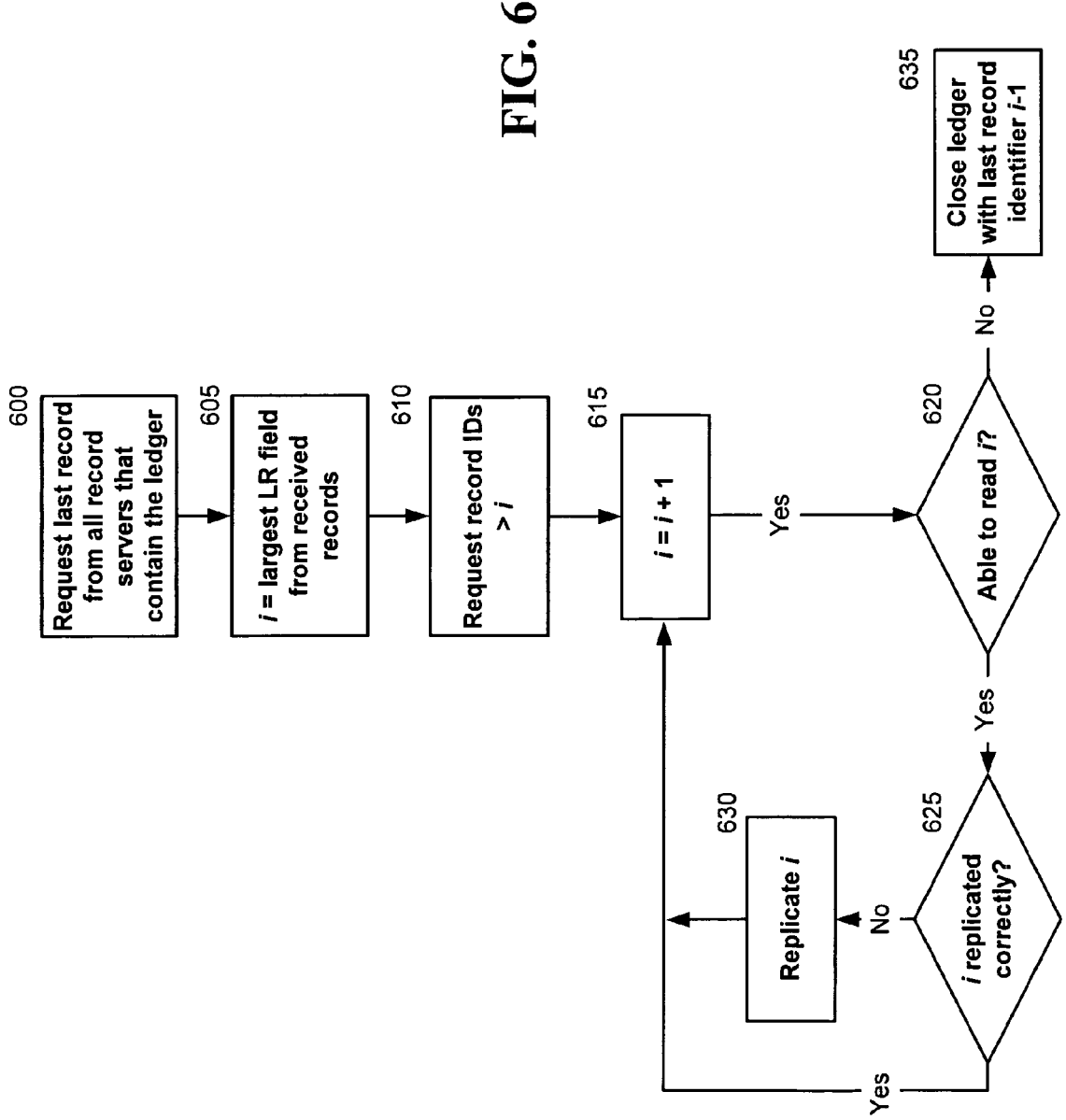
FIG. 6 is a logical flowchart of the general process of recovering a ledger.

To ensure a ledger was closed out correctly (and to close it out correctly if it was not), a multi-stage process may be used. FIG. 6 is a logical flowchart of the general process of recovering a ledger. At block 600, the client requests—from each record server that contains the subject ledger—the last record successfully written to the ledger. In an embodiment, the client may attempt to validate the responses (e.g., via an authentication scheme), and may disregard those that do not check out. At block 605, the client sets i equal to the largest LR field of the [valid] received records. At block 610, the client requests—from the ledger device of each record server that contains the subject ledger—a list of all record IDs in its piece of the ledger that are greater than i.

At block 615, i is incremented by one, such that it corresponds to the record ID that is one past the largest LR field, as previously determined. At block 620, the client attempts to read the record with record ID i. If record i cannot be read from any of the record servers whose associated list contains a record ID equal to i, then i−1 is the record ID of the last record in the ledger, and the ledger may be closed accordingly, as shown at block 635. If i can be read from at least one of the record servers whose list contains a record ID equal to i, then, at block 625, the client attempts to read i from every record server whose list contains a record ID equal to i, until it is verified that either a quorum of record servers has the record, or that all of the record servers that claimed to have the record, actually do have the record. If a quorum of record servers has the record, then the process jumps to block 615, where i is again incremented by one so as to correspond to the next record ID. Going back to block 625, if it is determined that the record is not written to a quorum of record servers, then, at block 630, the record is written to quorum of record servers (by, for example, the process outlined in FIG. 3), after which i is again incremented at block 615. The incrementing of i by one continues until record i cannot be read at block 620, and the ledger is subsequently closed at 635.

The sequence and numbering of blocks depicted in FIGS. 3, 4, 5, and 6 is not intended to imply an order of operations to the exclusion of other possibilities. For example, it may be the case that at block 610, if no record IDs>i are received, then the process may jump to block 635 (because there are no records to add), instead of attempting to read i+1 at block 620. Those of skill in the art will appreciate that the foregoing systems and methods are susceptible of various modifications and alterations.

Those of skill in the art also will appreciate that the methods described herein may be performed on a computer which executes instructions stored on a computer-readable medium. The medium may comprise a variety of volatile and non-volatile storage devices, systems, or elements, including but not limited to solid-state memory, fixed media devices, and removable media which may be used in computers having removable media devices.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A system for storing and retrieving at least one of a plurality of records, the plurality of records associated with a ledger, said system comprising:
    a plurality of record servers for responding to requests received from a client that issues read and write requests associated with the at least one record, wherein each record server comprises:
        a request processor for receiving the requests issued by the client;
        a log device for storing the at least one record according to a write instruction received from the request processor; and
        at least one ledger device for storing or retrieving the at least one record according to a write or read instruction received from the request processor, wherein the ledger is assigned to the at least one ledger device, and each record written to the at least one ledger device is also written to the log device; and
    a management server for maintaining and coordinating, between the client and the record servers, information associated with the at least one ledger device, the at least one record, and the plurality of record servers, the information including a list indicative of which of the plurality of record servers are currently available to respond to requests from the client.

2. The system of claim 1 wherein each record is written to a subset of the plurality of record servers.

3. The system of claim 2 wherein the number of record servers in the plurality of record servers is equal to 3t+1, where t is the maximum number of record servers that can fail simultaneously.

4. The system of claim 3 wherein the subset comprises at least 2t+1 record servers.

5. The system of claim 2 wherein the number of record servers in the plurality of record servers is equal to 2t+1, where t is the maximum number of record servers that can fail simultaneously.

6. The system of claim 5 wherein the subset comprises at least t+1 record servers.

7. The system of claim 1 wherein each record comprises:
a record ID to uniquely identify the record;
a ledger ID to uniquely identify the ledger;
a final record ID to uniquely identify the last record written to the ledger; and
record data.

8. The system of claim 1 wherein the log device stores records synchronously.

9. The system of claim 1 wherein the at least one ledger device stores records asynchronously.

10. The system of claim 1 wherein the management server maintains:
a list indicative of which of the plurality of record servers has been used for the ledger; and
the largest record ID associated with a record that has been written to the ledger.

11. A method of storing a first record to a plurality of record servers, said method comprising using a processor to perform the steps of:
associating the first record with a ledger;
selecting, from the plurality of record servers, a first subset of record servers, wherein each record server in the first subset is associated with the ledger;
issuing a write request to each record server in the first subset;
receiving an acknowledgement from each record server in the first subset that the write was successful;
when, after a predetermined amount of time, a first acknowledgement is not received from each record server in the first subset, repeating said selecting and said issuing until a first acknowledgement is received from each record server in the first subset;
when, for any of the plurality of records in the ledger that comes before the first record in the ledger, it is not known whether that record has been written to a second subset of record servers, waiting until a second acknowledgement has been received confirming that the record has been written to the second subset of record servers, wherein each record server in the second subset is associated with the ledger; and
acknowledging that the first record was stored to the first subset.

12. The method of claim 11 wherein said acknowledging comprises information associated with the record.

13. The method of claim 12 wherein the information associated with the record comprises:
a first record ID uniquely identifying the record;
a second record ID uniquely identifying the last known record written to the ledger before the record corresponding to the first record ID; and
a list of the record servers comprising the first subset.

14. A method of closing out a ledger, said method comprising using a processor to perform the steps of:
when there are any outstanding records to be written to the ledger, waiting for the writes to complete;
sending to a management server record information comprising:
a record ID uniquely identifying the last record written to the ledger; and
a ledger ID uniquely identifying the ledger;
receiving an acknowledgement from the management server that the record information has been received by the management server;
when, after a predetermined period of time, an acknowledgement has not been received from the management server, repeating said sending until the management server acknowledges; and
acknowledging that the ledger is closed.

15. A method of recovering a ledger from a fault, wherein the ledger comprises a plurality of records, said method comprising using a processor to perform the steps of:
determining a subset of record servers from a plurality of record servers, wherein the subset comprises all record servers in the plurality of record servers that are associated with the ledger;
receiving, from each record server in the subset, the last record written to the ledger, wherein each record comprises:
a first record ID uniquely identifying the record; and
a second record ID uniquely identifying the last known record written to the ledger before the record corresponding to the first record ID;
determining, from the received records, the largest second record ID and setting a variable i equal to the largest second record ID;
receiving, from each record server in the subset, a list of record IDs corresponding to every record in the ledger with a record ID greater than the largest second record ID i;
closing the ledger when none of the lists received from the record servers contains a record ID greater than the largest second record ID i with the record ID of the last record written to the ledger set equal to the largest second record ID i;
for each record ID j greater than the largest second record ID i received in the lists from the record servers, starting with a record ID j that is equal to one plus the largest second record ID i and continuing until the ledger is closed with the record ID of the last record written to the ledger set equal to j minus one:
attempting to read a record having record ID j from the record server associated with each of the received lists that contains a record ID equal to j:
when the record cannot be read from any of the associated record servers, closing the ledger;
when the record can be read from a quorum of the associated record servers, incrementing j by one; and
when the record can be read from at least one of the associated record servers, but from less than a quorum:
writing the record to a quorum of record servers from the subset; and
incrementing j by one.

16. A non-transitory computer-readable storage medium encoded with a set of instructions which, when performed by a computer, perform a method of storing a first record to a plurality of record servers, said method comprising:
associating the first record with a ledger;
selecting, from the plurality of record servers, a first subset of record servers, wherein each record server in the first subset is associated with the ledger;
issuing a write request to each record server in the first subset;
receiving an acknowledgement from each record server in the first subset that the write was successful;

when, after a predetermined amount of time, a first acknowledgement is not received from each record server in the first subset, repeating said selecting and said issuing until a first acknowledgement is received from each record server in the first subset;

when, for any of the plurality of records in the ledger that comes before the first record in the ledger, it is not known whether that record has been written to a second subset of record servers, waiting until a second acknowledgement has been received confirming that the record has been written to the second subset of record servers, wherein each record server in the second subset is associated with the ledger; and acknowledging that the first record was stored to the first subset.

17. The non-transitory computer-readable storage medium of claim 16 wherein said acknowledging comprises information associated with the record.

18. The non-transitory computer-readable storage medium of claim 17 wherein the information associated with the record comprises:
   a first record ID uniquely identifying the record;
   a second record ID uniquely identifying the last known record written to the ledger before the record corresponding to the first record ID; and
   a list of the record servers comprising the first subset.

19. A non-transitory computer-readable storage medium encoded with a set of instructions which, when performed by a computer, perform a method of closing out a ledger, said method comprising;
   when there are any outstanding records to be written to the ledger, waiting for the writes to complete;
   sending to a management server record information comprising:
      a record ID uniquely identifying the last record written to the ledger; and
      a ledger ID uniquely identifying the ledger;
   receiving an acknowledgement from the management server that the record information has been received by the management server;
   when, after a predetermined period of time, an acknowledgement has not been received from the management server, repeating said sending until the management server acknowledges; and
   acknowledging that the ledger is closed.

20. A non-transitory computer-readable storage medium encoded with a set of instructions which, when performed by a computer, perform a method of recovering a ledger from a fault, wherein the ledger comprises a plurality of records, said method comprising:
   determining a subset of record servers from a plurality of record servers, wherein the subset comprises all record servers in the plurality of record servers that are associated with the ledger;
   receiving, from each record server in the subset, the last record written to the ledger, wherein each record comprises:
      a first record ID uniquely identifying the record; and
      a second record ID uniquely identifying the last known record written to the ledger before the record corresponding to the first record ID;
   determining, from the received records, the largest second record ID and setting a variable i equal to the largest second record ID;
   receiving, from each record server in the subset, a list of record IDs corresponding to every record in the ledger with a record ID greater than the largest second record ID i;
   closing the ledger when none of the lists received from the record servers contains a record ID greater than the largest second record ID i with the record ID of the last record written to the ledger set equal to the largest second record ID i;
   for each record ID j greater than the largest second record ID i received in the lists from the record servers, starting with a record ID j that is equal to one plus the largest second record ID i and continuing until the ledger is closed with the record ID of the last record written to the ledger set equal to j minus one:
      attempting to read a record having record ID j from the record server associated with each of the received lists that contains a record ID equal to j:
         when the record cannot be read from any of the associated record servers, closing the ledger;
         when the record can be read from a quorum of the associated record servers, incrementing j by one; and
         when the record can be read from at least one of the associated record servers, but from less than a quorum:
            writing the record to a quorum of record servers from the subset; and
            incrementing j by one.

* * * * *